US007457705B2

(12) United States Patent
Takahashi et al.

(10) Patent No.: US 7,457,705 B2
(45) Date of Patent: Nov. 25, 2008

(54) NAVIGATION APPARATUS FOR DISPLAYING THREE-D STORED TERRAIN INFORMATION BASED ON POSITION AND ATTITUDE

(75) Inventors: Yoshitaka Takahashi, Hitachi (JP); Munetoshi Unuma, Hitachinaka (JP); Takeshi Horie, Toride (JP); Fumitaka Otsu, Yachiyo (JP)

(73) Assignee: Hitachi, Ltd., Tokyo (JP)

( * ) Notice: Subject to any disclaimer, the term of this patent is extended or adjusted under 35 U.S.C. 154(b) by 331 days.

(21) Appl. No.: 11/206,821

(22) Filed: Aug. 19, 2005

(65) Prior Publication Data
US 2006/0074549 A1  Apr. 6, 2006

(30) Foreign Application Priority Data
Oct. 1, 2004 (JP) ............................. 2004-289513

(51) Int. Cl.
*G01C 21/32* (2006.01)
(52) U.S. Cl. .................. 701/211; 701/208; 701/209; 340/995.17; 340/995.19; 340/996.24
(58) Field of Classification Search ................. 701/211
See application file for complete search history.

(56) References Cited
U.S. PATENT DOCUMENTS

| | | | | |
|---|---|---|---|---|
| 2,526,682 A * | 10/1950 | Mulberger et al. | ........... | 342/107 |
| 3,193,822 A * | 7/1965 | Meneley et al. | ............... | 342/64 |
| 3,231,887 A * | 1/1966 | Cross et al. | .................... | 342/64 |
| 4,552,533 A * | 11/1985 | Walmsley | .................... | 434/12 |
| 4,830,464 A * | 5/1989 | Cheysson et al. | ............... | 345/8 |
| 4,876,651 A * | 10/1989 | Dawson et al. | .............. | 701/200 |
| 5,179,638 A * | 1/1993 | Dawson et al. | .............. | 345/582 |
| 5,412,569 A * | 5/1995 | Corby et al. | ................... | 701/2 |
| 5,422,812 A * | 6/1995 | Knoll et al. | ................. | 701/209 |
| 5,550,758 A * | 8/1996 | Corby et al. | ................. | 702/150 |
| 5,706,195 A * | 1/1998 | Corby et al. | ................... | 701/2 |
| 5,721,679 A * | 2/1998 | Monson | ...................... | 701/207 |
| 5,745,387 A * | 4/1998 | Corby et al. | ................... | 703/1 |
| 5,751,576 A * | 5/1998 | Monson | ...................... | 700/83 |
| 5,781,437 A * | 7/1998 | Wiemer et al. | ................. | 701/2 |

(Continued)

FOREIGN PATENT DOCUMENTS

JP      11-108684      4/1999

(Continued)

*Primary Examiner*—Thomas G. Black
*Assistant Examiner*—Shelley Chen
(74) *Attorney, Agent, or Firm*—Crowell & Moring LLP

(57) ABSTRACT

A terminal apparatus of the present invention having a position detection unit and a display unit further includes a geographic information storage unit for storing three-dimensional terrain shape information, an attitude detection unit for detecting the attitude of the terminal apparatus, and an image creation unit for obtaining information on a vector vertical to the display unit based on information on the attitude obtained by the attitude detection unit and creating a three-dimensional terrain image at a viewpoint using a current position obtained by the position detection unit, information on a line-of-sight defined by the information on the vector, and the three-dimensional terrain shape information in the geographic information storage unit. When the attitude of the terminal apparatus is changed, the three-dimensional terrain image on the display unit is updated, following a change in the attitude of the terminal apparatus.

2 Claims, 13 Drawing Sheets

U.S. PATENT DOCUMENTS

| | | | | |
|---|---|---|---|---|
| 5,838,262 | A * | 11/1998 | Kershner et al. | 340/945 |
| 6,822,624 | B2 * | 11/2004 | Naimer et al. | 345/9 |
| 7,216,035 | B2 * | 5/2007 | Hortner et al. | 701/211 |
| 2001/0027456 | A1 * | 10/2001 | Lancaster et al. | 707/104.1 |
| 2001/0039475 | A1 * | 11/2001 | McCarthy et al. | 701/213 |
| 2002/0080017 | A1 * | 6/2002 | Kumata et al. | 340/436 |
| 2002/0123841 | A1 * | 9/2002 | Satoh et al. | 701/208 |
| 2004/0174275 | A1 * | 9/2004 | Coppolino | 340/945 |
| 2005/0071082 | A1 * | 3/2005 | Ohmura et al. | 701/211 |
| 2005/0107952 | A1 * | 5/2005 | Hoshino et al. | 701/211 |
| 2006/0074549 | A1 * | 4/2006 | Takahashi et al. | 701/207 |
| 2006/0155467 | A1 * | 7/2006 | Hortner et al. | 701/211 |

FOREIGN PATENT DOCUMENTS

| | | | |
|---|---|---|---|
| JP | 2003148994 A | * | 5/2003 |
| JP | 2003-232639 | | 8/2003 |

* cited by examiner

NAVIGATION APPARATUS FOR DISPLAYING THREE-D STORED TERRAIN INFORMATION BASED ON POSITION AND ATTITUDE

BACKGROUND OF THE INVENTION

The present invention relates to a navigation system. More specifically, the invention relates to a system for giving route guidance to a walker, using a portable terminal.

There is provided a navigation technique using a three-dimensional map display for displaying on a display screen a projection plane obtained when a three-dimensional map is seen from an arbitrary viewpoint, so as to implement a navigation system that is intuitively obvious. This technique is disclosed in JP-A-2003-232639, for example. When a navigation apparatus with the three-dimensional map display is implemented, it sometimes happens that a map component to be noted is hidden behind other map component, depending on the position of a viewpoint. For this reason, information that a user wishes to know, such as a current position, a destination, or a route connecting the current position and the destination is not sometimes displayed on the display screen. The publication described above aims to provide a map display device and the navigation apparatus that have implemented the three-dimensional map-display cap able of displaying information on the map component hidden from the other map component, using the technique disclosed in the publication.

As another method of implementing the intuitively obvious navigation system, there is further provided a technology referred to as "Mixed Reality" technology, in which a CG (Computer Graphic) image for navigation is superimposed on an actually photographed image of a real world, for display.

Further, there is disclosed a technique in JP-A-11-108684, in which the image of a landscape in a traveling direction of a vehicle is picked up by an image pick-up camera mounted on a nose or the like of the vehicle, and navigation information elements are superimposed on the image of the landscape in the background by an image synthesis unit, for display. This technique aims to cause a driver to more intuitively grasp the current position and the traveling route of the vehicle than in a case in which the driver depends depending on a graphic display alone.

SUMMARY OF THE INVENTION

An object of the present invention is to provide a navigation system that is intuitively obvious. Assume that a walker uses navigation, for example. Then, in order to provide the navigation which is intuitively obvious, correspondence between the image of a real world which would be seen by the walker and the image of the navigation should be intuitively obvious. For this reason, in the present invention, in addition to just being able to make access to a geographic information database, detecting the attitude of screen of a terminal, and whatever attitude the terminal is in, displaying on the screen of the terminal the navigation image matching the real world which would be seen by the walker are required.

Further, in the present invention, in order to give more intuitive guidance, in addition to a CG image being created to match the real world, the image of the real world (actually photographed image) is taken by a camera, and the CG image of a route or the like for navigation is superimposed on this actually photographed image, for display. In this case, a portable terminal with camera is held by the walker and is operated. Thus, it becomes important to detect the attitude of the camera and the attitude of the screen so as to accurately align the actually photographed image with the CG image. However, in the technique disclosed in JP-A-2003-232639, the CG image is displayed on all of the display screen, so that detection of the attitude of the camera was not required. When the technique disclosed in JP-A-11-108684 is applied to a navigation terminal of a portable type, position detection is performed, but detection of the attitude of the camera is not performed. Thus, the actually photographed image photographed with the navigation terminal with camera of the portable type is not aligned with the CG image.

On the other hand, through expanded reality technology, which has been hitherto known, the geographic information database is not always utilized fully. Thus, it is hard to say that the technique of the expanded reality has been fully applied to the area of the navigation.

The present invention is therefore aims to provide a navigation system that uses a portable information terminal in which by making access to the geographic information database, detecting the attitude of the portable information terminal, and using information thereby obtained, a CG image for guidance matching a landscape actually seen by the user of the terminal is created. Another object of the present invention is to implement navigation that is intuitively obvious, using a portable information terminal with camera. In order to implement the navigation that is intuitively obvious according to the present invention, the geographic information database is accessed, the attitude of the portable information terminal and the attitude of the camera are detected, and a CG image for guidance is accurately superimposed on an actually photographed image, for display.

In order to solve the problems described above, in addition to a conventional position detection unit, the present invention includes an attitude detection unit, a geographic database access unit, and a CG image creation unit for giving route guidance matching the real world seen by the user. The invention further includes the camera and a camera attitude detection unit, and thereby achieves accurate superimposition of a CG image on an image of the real world seen by the user and photographed by the camera.

According to the technique of the present invention, even if the portable information terminal with camera is used, natural superimposition of a CG image on an image actually photographed with the camera is achieved. Further, the geographic information database is utilized. The navigation system that is intuitively obvious can be thereby implemented.

Other objects, features and advantages of the invention will become apparent from the following description of the embodiments of the invention taken in conjunction with the accompanying drawings.

DESCRIPTION OF THE EMBODIMENTS

A navigation system according to an embodiment of the present invention will be described with reference to the drawings.

FIRST EMBODIMENT

Figure 1:
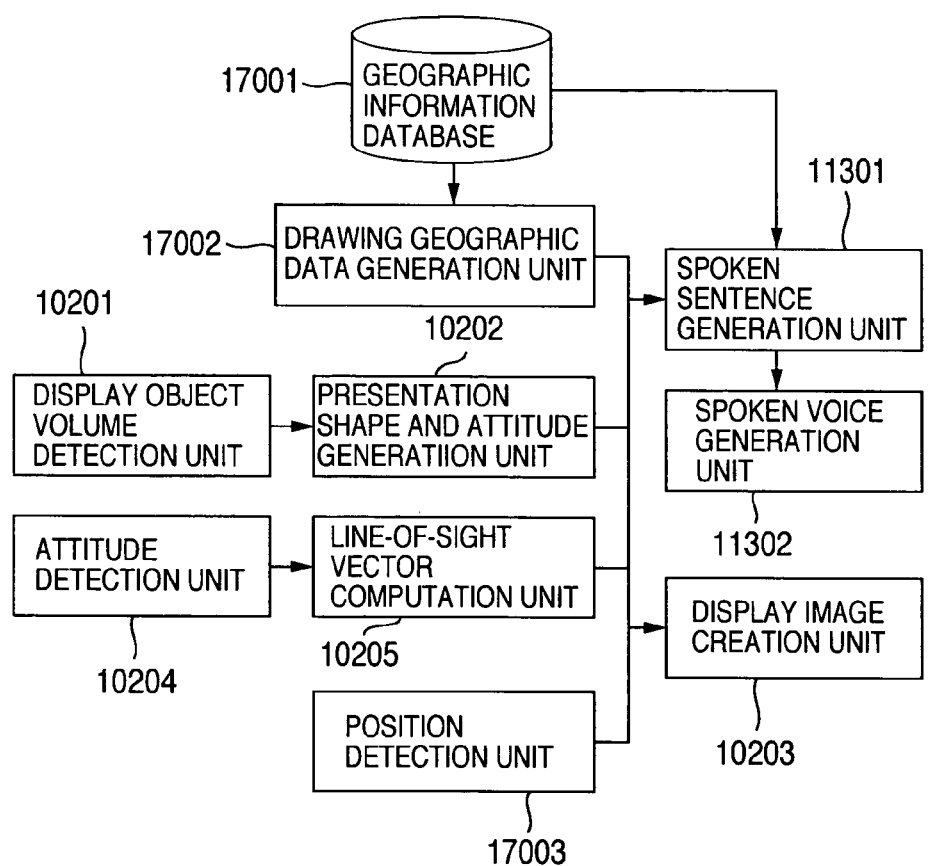
FIG. 1 is a block diagram showing a navigation apparatus according to a first embodiment of the present invention.

FIG. 1 is a diagram showing an overall configuration of a navigation apparatus of the present invention. The navigation apparatus includes a line-of-sight vector computation unit 10205, an attitude detection unit 10204, a display object volume detection unit 10201, a presentation shape and attitude generation unit 10202, and a display image creation unit 10203. The attitude detection unit 10204 detects the attitude of a terminal. Then, based on the amount of the detection, the line-of-sight vector computation unit 10205 computes a line-of-sight vector perpendicular to the screen of the navigation apparatus. The presentation shape and attitude generation unit 10202 determines the shape and attitude of a display object, for presentation, so as to display the amount of the detection. The display image creation unit 10203 displays a display image using the shape of the display object generated by the presentation shape and attitude generation unit 10202 and the line-of-sight vector computed by the line-of-sight vector computation unit 10205.

Figure 2:
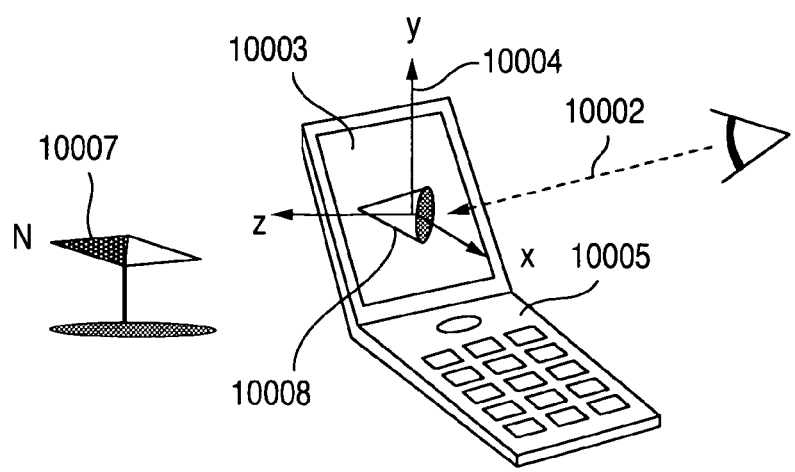
FIG. 2 is an external view of the navigation apparatus in the first embodiment of the present invention.
Figure 3:
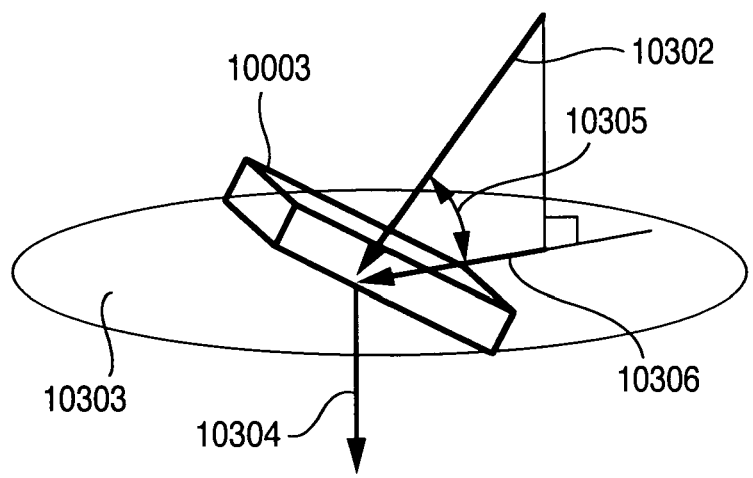
FIG. 3 shows an example of an attitude detection unit of a terminal.
Figure 4:
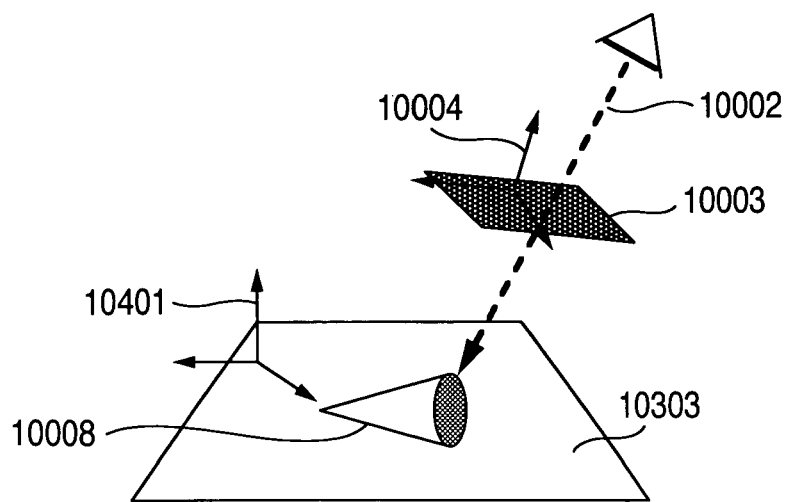
FIG. 4 is a diagram showing a relationship between the line of sight and the volume of a display object.

Next, an operation of the navigation apparatus in FIG. 1 will be described, using FIGS. 2 to 4. FIG. 2 is an external view of the terminal used as the navigation apparatus according to the present invention. FIG. 3 shows an example of an operation of the attitude detection unit 10204 of the terminal. FIG. 4 is a diagram showing a relationship between the line of sight and the volume of the display object. In this embodiment, an example of display will be described where a vector indicating the magnetic north parallel to a horizontal plane (e.g. the vector indicated by a compass 10007) is regarded as the volume of the display object. In this example, the display is performed so that, as the attitude of the terminal is changed variously, the compass 1007 is visualized through a display screen 10003 mounted on a terminal 10005 used as a view window.

The terminal 10005 in this embodiment has an external appearance of a cellular phone on which an application program is run. However, any terminal such as a PDA (Personal Digital Assistant) or a watch having a display screen, which has a screen such as the screen 10003 capable of displaying the shape of a display object and on which the application program is run, can be used.

The terminal 10005 includes the attitude detection unit 10204 for detecting the attitude of the terminal. Using the attitude detection unit 10204, the attitude of the screen is detected. An example of the attitude detection will be described with reference to FIG. 3. It is assumed that the attitude detection unit 10204 includes an acceleration sensor and a magnetic sensor and is mounted in the screen 10003. A gravity vector 10304 is determined, using the acceleration sensors of three axes, for example. In a static state of the terminal, the acceleration of gravity is 1 G and is a component normal to a horizontal plane 10303. When the screen 10003 is inclined, the amount of an output proportional to an angle formed between the gravity vector 10304 and each acceleration sensor is output from the each acceleration sensor. Accordingly, the gravity vector 10304 acting on the screen 10003 can be obtained using the amount of the component of each output of the sensors. In other words, the components of the gravity vector indicate the inclination of the screen 10003.

Next, in order to determine a direction in which the screen 10003 is orientated, a geomagnetic vector is utilized. A geomagnetic vector 10302 is oriented in the direction of a magnetic north vector 10306 indicating the magnetic north to the horizontal plane 10303, with an angle of dip 10305 formed with the magnetic north vector 10306. The geomagnetic vector 10302 can be observed, using the magnetic sensors of three axes.

Accordingly, by using the gravity vector 10304 and the geomagnetic vector 10302 described above, the inclination of the screen 1003 and the absolute orientation of the screen 10003 can be detected. Thus, the absolute attitude (inclination and orientation) of the screen 10003 can be detected. When the attitude of the screen 1003 can be detected, a line-of-sight vector 10002 perpendicular to the screen can be obtained. This computation is performed using the line-of-sight vector computation unit 10205 for calculating the line-of-sight vector perpendicular to the screen.

Next, the display object volume detection unit 10201 will be described. In this embodiment, the magnetic north vector is used as the volume of the display object. Thus, the display object volume detection unit 10201 uses the output of a magnetic sensor. As the output of the magnetic sensor, the outputs of the magnetic sensors that have detected the attitude of the screen 10003 can be used without alteration. The magnetic north vector 10306 can be obtained by projecting the geomagnetic vector 10302 onto the horizontal plane 10303. This projection calculation is performed by the presentation shape and attitude generation unit 10202 for determining the shape and attitude of a display object for presentation. Herein, the shape for presentation is defined to be the shape by which a direction indicated by the magnetic north vector is displayed to be easily recognized. In FIG. 2, a triangular pyramid 10008 is used as the shape for presentation. The attitude for presentation is the direction of the magnetic north vector and can be determined by the above-mentioned approach using the projection. An arrow or a human finger other than the triangle pyramid, for example, may be naturally used as the attitude for presentation. This attitude for presentation is subject to coordinate transformation on the screen in the same direction of the geomagnetic vector 10302.

An approach for performing display on the screen 10003 based on the line-of-sight vector 10002 and the attitude of the display object volume 10008 will be described with reference to FIG. 4. For arrangement of the display object volume 10008, a world coordinate system 10401 is employed. For display of the display object volume 10008, a screen coordinate system 10004 is employed. The position of a viewpoint is assumed to be on the line-of-sight vector 10002 in the screen coordinate system 10004. The line-of-sight vector 10002 is perpendicular to the screen and passes through the point of origin of the screen coordinate system. The point of regard is positioned at the display object volume 10008 in the world coordinate system 10401. Accordingly, by performing perspective transformation of the position of the display object volume 10008 to the position of the viewpoint in the screen coordinate system 1004, the presentation shape of the display object volume 10008 on the screen 10003 is determined. Then, by changing the attitude of the screen 10003, display of the presentation shape of the display object volume 10008 is changed.

Figure 5:
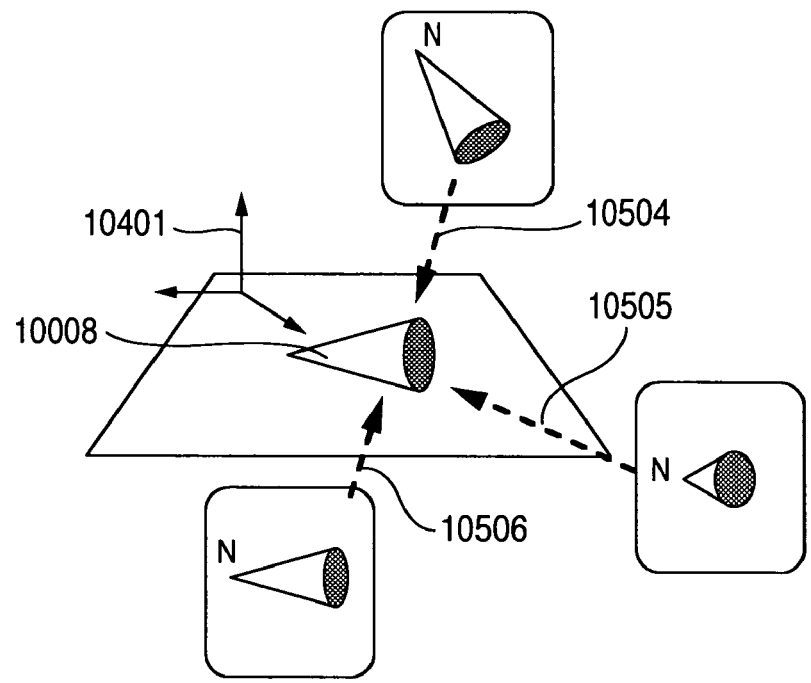
FIG. 5 shows examples of a change in display resulting from a change in the attitude of a screen.

FIG. 5 shows examples of the display and the positions of viewpoints. A line of sight 10506 indicates a state in which the perpendicular direction of the screen 10003 is oriented to the east. In this case, the display object volume 10008 is displayed to point to the left, which indicates the north is on the left side of the screen 10003. A line of sight 10505 indicates a state in which the screen 10003 is made to stand in an upright position, being oriented substantially in the direction of the north northeast. In this case, the display object volume is slightly oriented to the left, which indicates that the north is in the slightly left direction of the screen 10003. A line of sight 10504 indicates a state in which the screen 10003 is made parallel to the ground and the display object volume 10008 is viewed through the screen from directly above. In this case, the direction of the north as seen from directly above is displayed. As described above, the display object volume 10008 (geomagnetic vector 10302) can be directly visualized even if the attitude of the screen 10003 is varied. The direction indicated by the display object volume 10008 thus can be intuitively recognized.

In this embodiment, a description was given to an example in which the geomagnetic vector 10203 is drawn as the display object volume 10008. An inclination of the horizontal plane 10303 or the geomagnetic vector 10302 can also be displayed as the display object volume 10008. This embodiment can also be applied as means for indicating the state of a field in which the display object volume is located.

Next, a method of displaying map information and the display object volume 10008 of a current position using a geographic information database 17001 and a position detection unit 17003 for a terminal will be described. The terminal position detection unit 17003 in FIG. 1 detects the position of the terminal, using the GPS (Global Positioning System), information on wireless LAN (Local Area Network) base stations, information on cellular phone base stations, information on RFIDs (Radio Frequency IDs) mounted on the ground, walls, and objects. The information on the detected position may be the values of geographic coordinates represented by a latitude, a longitude, and a height, or the values of a three-dimensional orthogonal coordinate system in which locations are represented by X, Y, Z values. The height may be an elliptical height, an altitude, a floor number, or the like. For observation of the height, an altimeter may be used in combination with the position detection unit. The configuration shown in FIG. 1 detects only the state of the field in which the display object volume 10008 is located. However, by detecting the information on the position by the position detection unit 17003, it can be seen where the terminal is located on a geographic position.

Figure 6:
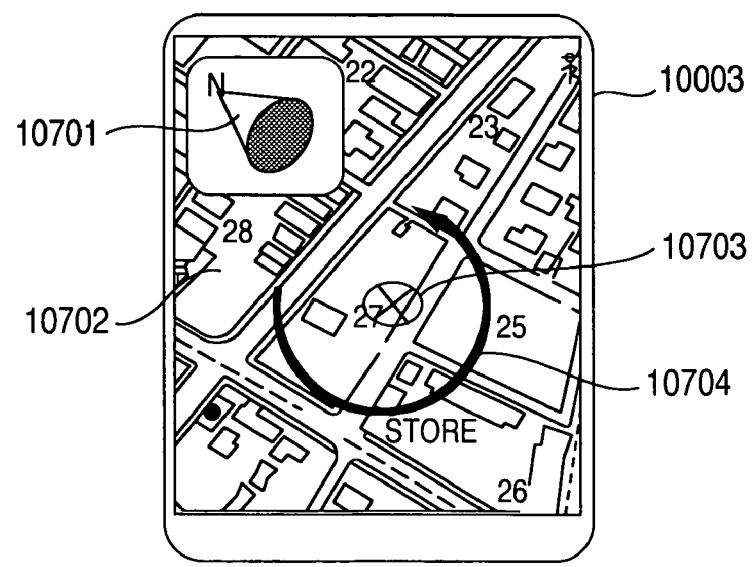
FIG. 6 shows an example of the screen for display when the volume of a display object is superimposed on a map for display.

In the geographic information database 17001, various data on geographic information such as road data, building data, locations and opening hours of shops is stored. The drawing geographic data generation unit 17002 converts the above-mentioned data to shape data so that the data can be visualized. When surrounding geographic information is converted into shape data by the drawing geographic data generation unit 17002 based on the information detected by the position detection unit 170003 for drawing, surrounding geographic information 10702 can be drawn, centering on a terminal position 10703 and with the upper end of the screen 10003 pointed to the north, as shown in FIG. 6. Further, by the approach described with reference to FIG. 2, a shape 10701 obtained by three-dimensional visualization of the volume of a display object (which is the magnetic north vector in this example) can be superimposed on the surrounding geographic information, for display. The shape 10701 indicating the magnetic north vector is an image obtained by visualization of the display object volume viewed through the view window according to the inclination of the screen 10003. By three-dimensionally visualizing information on the terminal position 10703 and the state of the magnetic north vector 10701, the terminal position and the state of the magnetic north vector can be intuitively recognized.

The direction in which the surrounding geographic information 10702 is displayed on the screen is fixed (with the upper end pointing to the north). However, by detecting the direction of a line of sight perpendicular to the screen 10003 by the line-of-sight vector computation unit 10205, a map can also be rotated with respect to the terminal position 10703 for display so that geographic information in the direction of the line of sight perpendicular to the screen 10003 is placed on the top portion of the screen. In this case, geographic information in the direction in which a user is oriented can be drawn on the top portion of the screen. Thus, presentation of the geographic information that can be more intuitively recognized becomes possible.

Figure 7A:
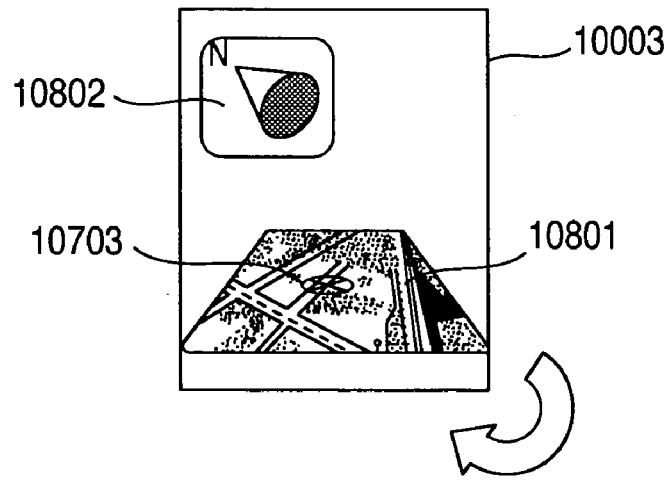
FIG. 7A shows an example of display when the screen is placed normal to a horizontal plane.
Figure 7B:
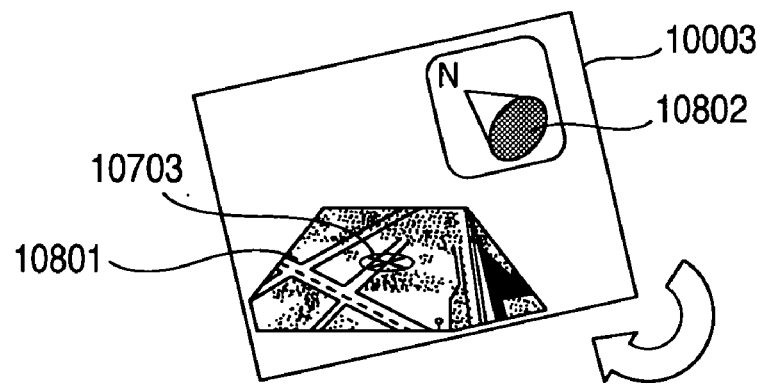
FIG. 7B shows an example of display when the screen in FIG. 7A is rotated clockwise.
Figure 7C:
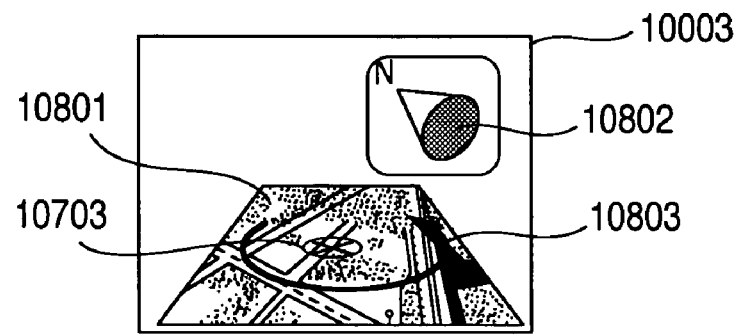
FIG. 7C shows an example of display when the screen in FIG. 7B is further rotated to be in a completely lateral position.

FIG. 7A shows an example in which a geographic information image is arranged in the same position as in the horizontal plane 10303 in FIG. 3, and is drawn. The state of the horizontal plane is detected, using the positional relationship between the horizontal plane and the screen 10003 calculated when the line-of-sight vector computation unit 10205 computes the line-of-sight vector 10002. By superimposing geographic data for drawing generated by the drawing geographic data generation unit 17002 on this horizontal plane, the geographic information (that is equivalent to a real world) viewed through the screen 10003 can be generated on the screen. FIG. 7A is the screen showing a state in which the geographic information is viewed through the screen 10003 placed vertical to the horizontal plane. Geographic information 10801 is drawn in perspective, so that the user can perceive depth of the geographic information. FIG. 7B shows an example in which the screen 10003 in FIG. 7A is rotated clockwise. According to the rotation, the position of the horizontal plane is changed, so that the geographic information 10801 is drawn to be parallel with the horizontal plane of the real world. FIG. 7C shows a state in which the screen 10003 is further rotated to be in a completely lateral position. Even in this state, the geographic information 10801 is drawn in the same positional relationship as the horizontal plane of the real world.

Further, when the direction of the viewpoint is rotated (e.g. when the viewing direction of the user is changed from the north to the west), the horizontal plane 10801 is also rotated with respect to the rotation axis 10703 of the screen 10003. Thus, even if the direction of the viewpoint is changed, the correspondence relationship with the real world will not be lost. Further, even when the screen is made parallel with the ground and an operation of looking into the ground is performed, the horizontal plane keeps track of the operation. Thus, the image of the geographic information such as the image of the geographic information 10702 in FIG. 6, seen from immediately above can be generated. Accordingly, in whichever direction the screen 10003 is rotated, the geographic information matching the real world can be provided. The geographic information that is intuitively obvious thus can be provided.

It may be so arranged that when an angle formed between a vector perpendicular to the screen and the gravity vector is detected to be equal to or less than a certain angle (such as 10 degrees or less) by the attitude detection unit, a two-dimensional map such as the one in FIG. 6 is displayed, and otherwise a three-dimensional map such as the one in FIG. 7 is displayed. In this case, in order to draw the map as shown in FIG. 6, the height of the viewpoint at the position detection unit of the terminal should be made higher (such as at an altitude of 100 m) than the height of the actual viewpoint, and the line-of-sight vector should be made to coincide with the gravity vector by the line-of-sight vector computation unit for calculating the line-of-sight vector perpendicular to the screen.

In order to use a voice in conjunction with image information or independently, for presentation, a spoken sentence generation unit 11301 and a spoken voice generation unit 11302 are employed as means for providing information other than the image information. The spoken sentence generation unit 1301 converts a relationship between the screen and a display object volume derived from the presentation shape and attitude generation unit 10202 and the line-of-sight vector computation unit 10205, which is the shape 10701 obtained by three-dimensional visualization of the display object volume in FIG. 6, for example, into a spoken sentence. When the attitude of the screen is as shown in FIG. 6 and the display object volume is oriented like the shape 10701, for example, the spoken sentence saying that "The depth direction on the upper left of the screen points to the north". The spoken sentence is converted into a voice signal by the spoken voice generation unit 11302, and is output as a voice through a loudspeaker or an earphone.

It is also possible to generate a spoken sentence for displayed geographic information using the spoken sentence generation unit 11301, based on a relationship between the geographic information database 17001 and a line-of-sight vector responsive to the attitude of the screen 10003 rather than a display object volume. When an image as displayed in FIG. 6 is displayed, for example, the spoken sentence saying that "A building on the right is an "ABC" building, while a building on the left is an "XYZ" building." is generated by the spoken sentence generation unit 11301 and output as a voice using the spoken voice generation unit. In the embodiment described above, the line-of-sight vector perpendicular to the screen was used as a reference. A voice may be output, using a vector pointing to a specific direction of the terminal as the reference. A direction pointed by the antenna of a cellular phone, for example, is included in the specific direction of the terminal. In this case, guidance of the name of a building or the name of a mountain located in the direction pointed by the antenna or the like can be provided by the voice alone, without viewing the screen.

The foregoing description was given, provided that the attitude detection unit 10204 and the display object volume detection unit 10201 are included in the terminal. The attitude detection unit 10204 and the display object volume detection unit 10201 may be attached to the outside of the terminal. In this case, by defining a relationship among the attitude of the screen, the attitudes and attaching positions of these units, the intuitively obvious navigation system of the present invention can be implemented.

Figure 8:
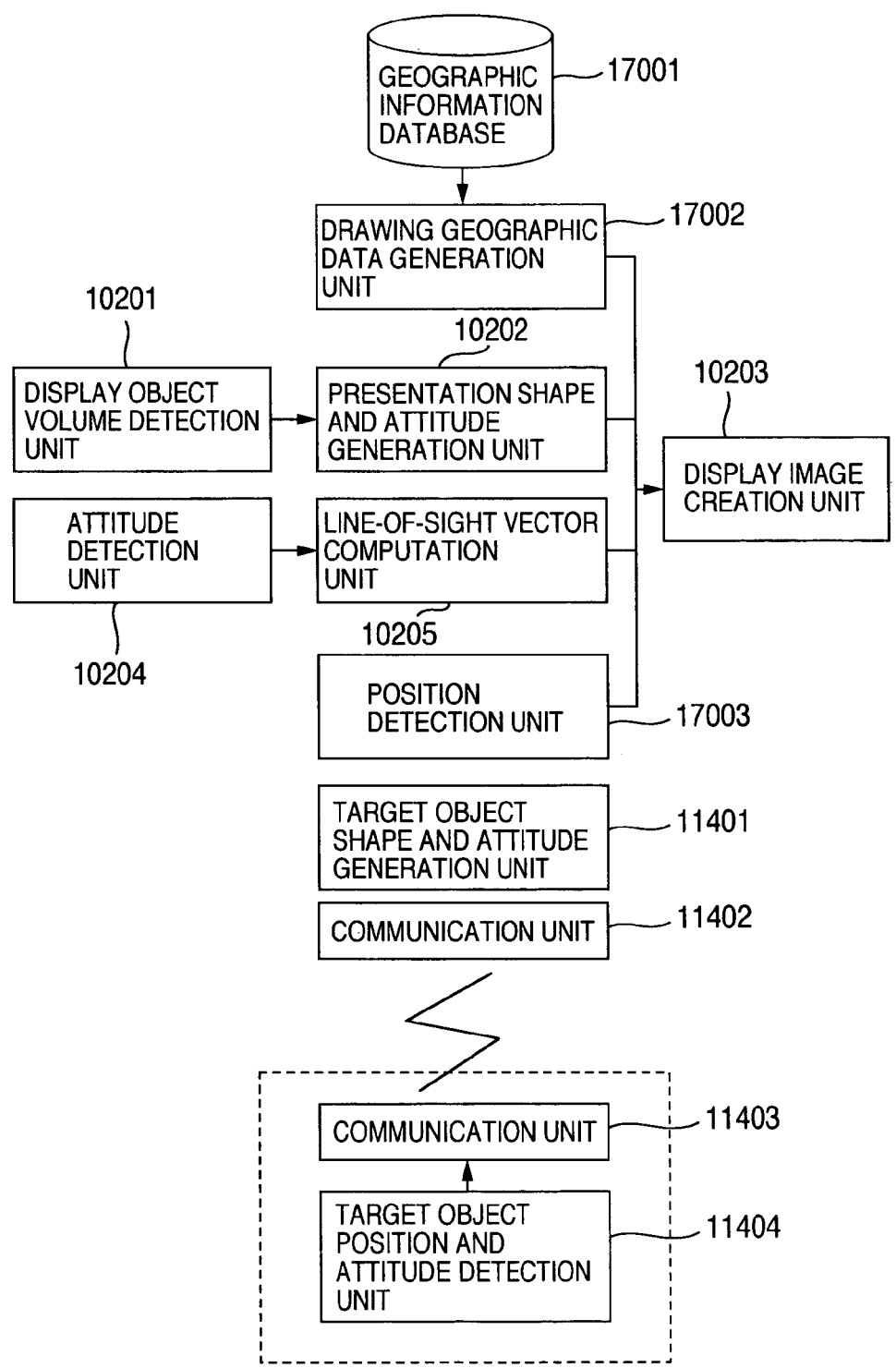
FIG. 8 is a block diagram when information on a display object is obtained by the use of a communication line.

Next, a description will be given to a variation of the first embodiment with reference to FIG. 8. In this variation of the first embodiment, a display object (or a target object) cannot be detected by the use of a terminal, and information on the target object is obtained by the use of a communication line, for display. The variation of this embodiment includes a target object shape and attitude generation unit 11401, communication units 11402 and 11403, and a target object position and attitude detection unit 11404. The target object position and attitude detection unit 11404 is a sensor that detects the position, attitude, and state of the target object, like the display object volume detection unit 10201. Using this sensor, positional information on the target object (including the height of the target object) and information on the detected attitude of the target object are sent to the target object shape and attitude generation unit 11401 through the communication units 11403 and 11402. The target object shape and attitude generation unit 11401 carries out transformation for performing graphic display of the volume of the target object detected by the target object position and attitude detection unit 11404, and a display image is drawn according to the display image creation method of the display image creation unit 10203 in view of the attitude of the terminal (screen 10003).

Figure 9:
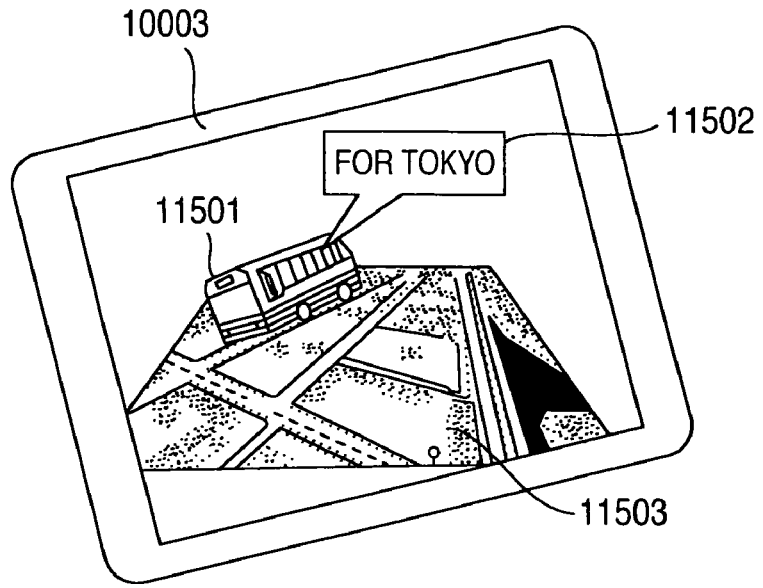
FIG. 9 shows an example of display when the position of a fixed-route bus is three-dimensionally obtained, for display.

When a shuttle bus is adopted as the target object, for example, the target object position and attitude detection unit 11404 detects the current position of the bus. The current position of the bus can be detected using the GPS or the like, for example. This information on the current position is transmitted to the terminal 10005 through the communication units 11403 and 11402. The position of the terminal 10005 can be detected by the position detection unit 17003 for the terminal, and the attitude of the screen can be detected by the line-of-sight vector computation unit 10205. Thus, when the screen 10003 of the terminal is oriented in the traveling direction of the bus, a current position 11501 of the bus can be three-dimensionally grasped, as shown in FIG. 9. A destination 11502 of the bus is displayed based on the ID information of the bus or the like. The attitude of the screen 10003 is detected. Thus, whatever attitude the terminal is in, if the bus is within the field of view of the screen, the position and direction of the bus can be kept track of FIG. 9 displays the bus as the target object. Even when a person whom the user of the terminal has promised to meet is drawn as the target object, the same approach can be used, for display. With this arrangement, in which direction the person is located now, and at what a distance the person is separated from the user of the terminal can be intuitively grasped.

SECOND EMBODIMENT

In the first embodiment, the image of the real world seen by the user of the navigation terminal is generated by CG (Computer Graphic), thereby providing route guidance. In this embodiment, the real world seen by the user of the navigation terminal is photographed with a camera attached to the terminal, and a CG image for the route guidance is superimposed on the image of the real world obtained by photographing the real world with the camera, thereby providing the route guidance.

Figure 10:
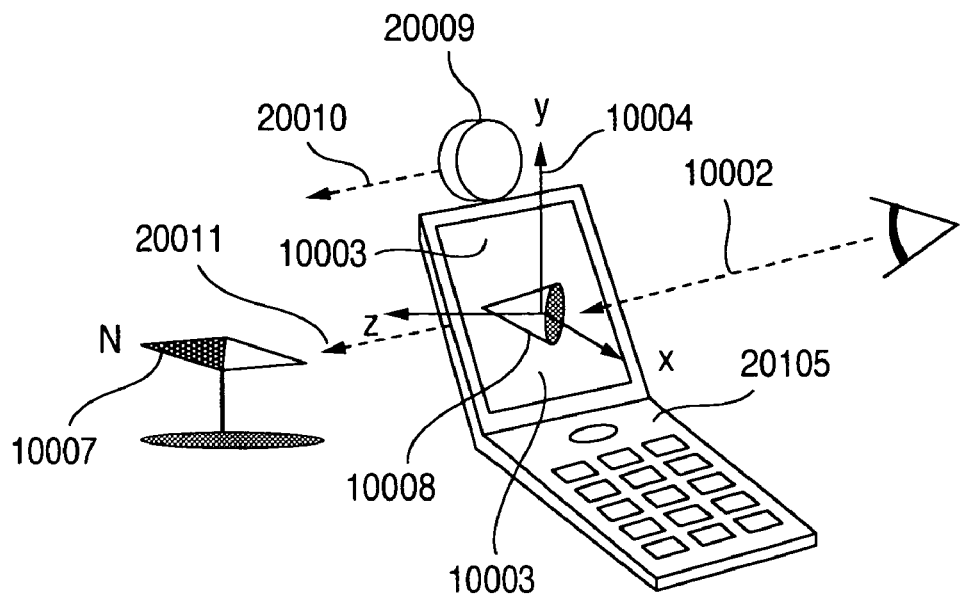
FIG. 10 is a perspective view showing a portable terminal with camera.

FIG. 10 is a diagram showing a cellular phone as an example of the portable terminal equipped with the camera. A camera 20009 is included in or connected to a cellular phone 20105, and an image obtained by photographing with the camera is displayed on the screen 10003. It is assumed that the relationship between a vector (line-of-sight vector) 20010 in the shooting direction of the camera and a vector 20011 perpendicular to the screen is known in advance. The cellular phone 20105 includes the attitude detection unit 10204 for detecting the attitude of the terminal. Using this attitude detection unit 10204, the attitude of the screen is detected. Referring to FIG. 10, the camera is mounted on the top of the screen. The shooting direction of the camera is, however, the same as the direction of the line of sight of the user of the terminal who looks into the screen.

Figure 11:
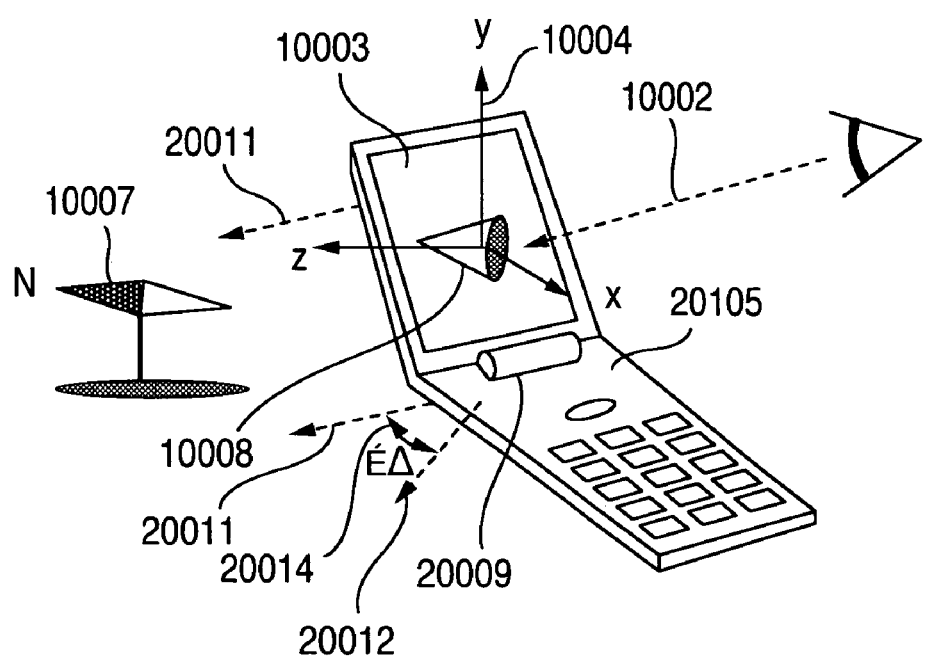
FIG. 11 is a perspective view showing a portable terminal with camera in which the orientation of the camera can be changed.

As another example of the configuration of mounting the camera, there may be conceived the configuration of mounting the camera of which the orientation can be changed. An example of the configuration described above is shown in FIG. 11. FIG. 11 shows the example in which the camera is rotatably mounted. The camera 20009 in FIG. 11 is attached to a folding hinged portion of the terminal, and the rotation angle of the camera can be changed with respect to the folding hinged portion. A rotation angle 20014 of the camera is defined to be a rotation angle $\theta$ of a line-of-sight vector 20012 of the camera relative to a vector 20011 perpendicular to the screen in FIG. 11. The light-of-sight vector of the camera herein refers to the vector that is parallel to the optical axis direction of the lens of the camera and directed from a point on the front surface of the lens. In this terminal, the rotation angle $\theta$ can be measured. Even when the user of the terminal manually rotates the camera, the relationship between the screen and the light-of-sight vector of the camera can be measured.

Figure 12:
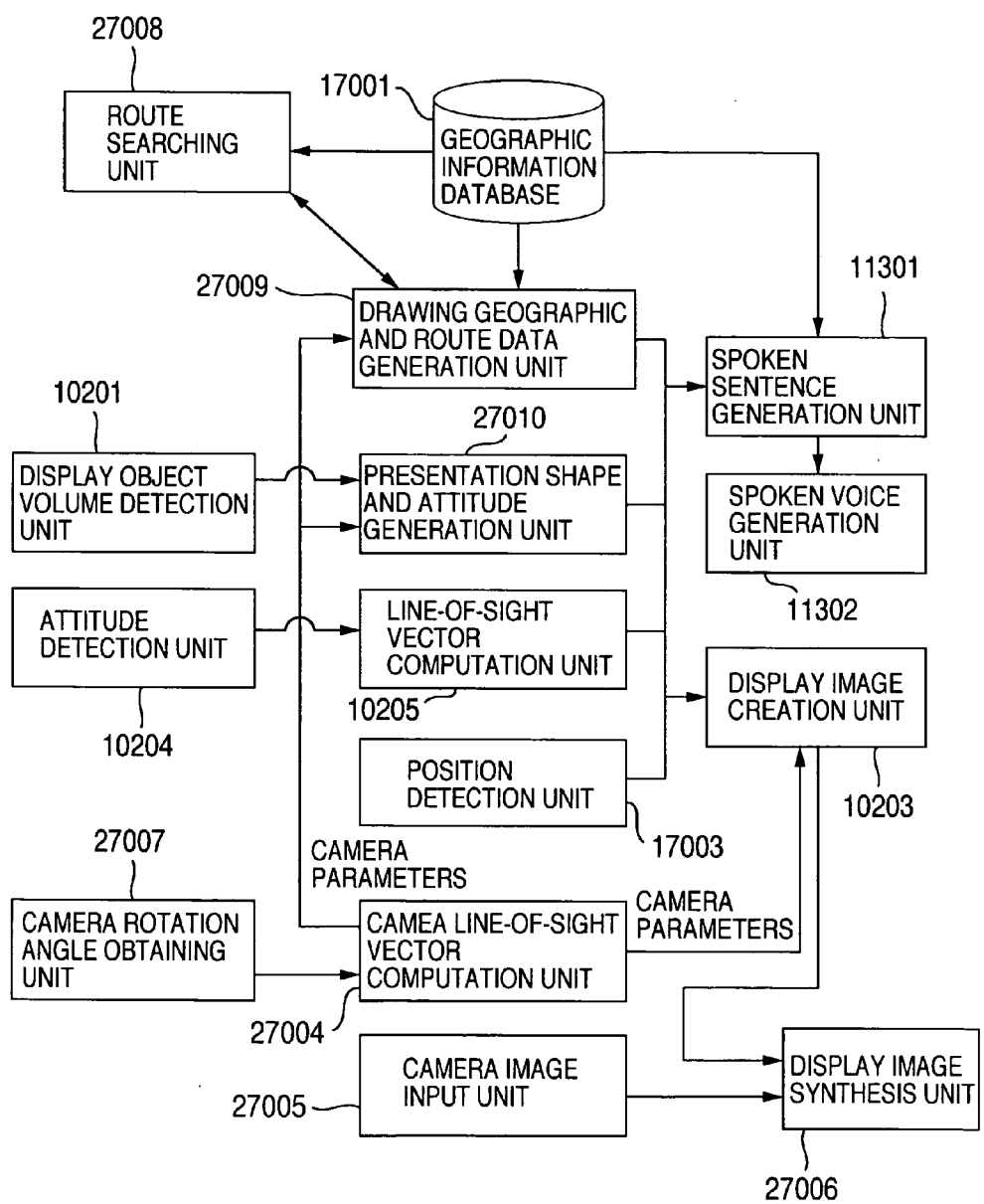
FIG. 12 is a block diagram showing a navigation system according to a second embodiment of the present invention.

Next, an operation of the navigation system will be described with reference to FIG. 12. The system in FIG. 12 includes a camera line-of-sight vector computation unit 27004, a camera image input unit 27005, a display image synthesis unit 27006, a camera rotation angle obtaining unit 27007, and a route searching unit 27008, in addition to the components of the system in FIG. 1 in the first embodiment. The system in FIG. 12 also includes a drawing geographic and route data generation unit 27009 in place of the drawing geographic data generation unit 17002.

The camera rotation angle obtaining unit 27007 obtains the rotation angle of the camera on the portable terminal and transmits information on the rotation angle to the camera line-of-sight vector computation unit 27004. The rotation angle of the camera herein refers to the rotation angle 20014, which is the rotation angle $\theta$ of the line-of-sight vector 20012 of the camera relative to the vector 20011 in FIG. 11. When a relationship between the camera and the attitude of the portable terminal is fixed as shown in FIG. 10, the camera rotation angle obtaining unit 27007 continues to output the rotation angle of zero degrees. The camera line-of-sight vector computation unit 27004 receives the information on the rotation angle of the camera. In addition, the camera line-of-sight vector computation unit 27004 holds information on the field angle of the camera and distortion of the lens therein as a database, and outputs to the display image creation unit 10203 camera parameters such as the field angle of the camera and the distortion of the lens required for projecting a CG image.

The camera image input unit 27005 successively obtains images from the camera attached to the portable terminal, and successively outputs to the display image synthesis unit 27006 the obtained images through streaming. The display image synthesis unit 27006 receives the CG image for navigation from the display image creation unit 10203, and superimposes the CG image on an input image from the camera, received from the camera image input unit 27005, for display on the screen of the portable terminal.

The route searching unit 27008 holds information on a starting point, a destination, a routing point, and traffic means (such as a bus, a train, an airplane, a ship, and the like) that has been set by the user in advance. Based on this information, the route searching unit 27008 makes access to the geographic information database 17001, thereby searching a route to be guided for a walker, and holds the result of the search in the route search unit 27008. The route search unit 27008 outputs a guidance route that has been searched in advance, as a three-dimensional coordinate data string, in response to a request from the drawing geographic and route data generation unit 27009.

The drawing geographic and route data generation unit 27009 visualizes geographic information such as road data, building data, and shop location data, stored in the geographic information database 17001, and also represents the guidance route as a three-dimensional CG image, based on the three-dimensional coordinate data string output by the route searching unit 27008. At the time of the representation, the drawing geographic and route data generation unit 27009 receives from the camera line-of-sight vector computation unit 27004 information on the camera parameters such as the field angle of the camera and the distortion of the lens, and creates the CG image matching the camera image based on the information on the parameters. The presentation shape and attitude generation unit 27010 for a display object also receives from the camera line-of-sight vector computation unit 27004 information on the camera parameters such as the field angle of the camera and the distortion of the lens. Then, based on the information on the parameters, the presentation shape and attitude generation unit creates the CG image of a display object volume matching the camera image.

Figure 13:
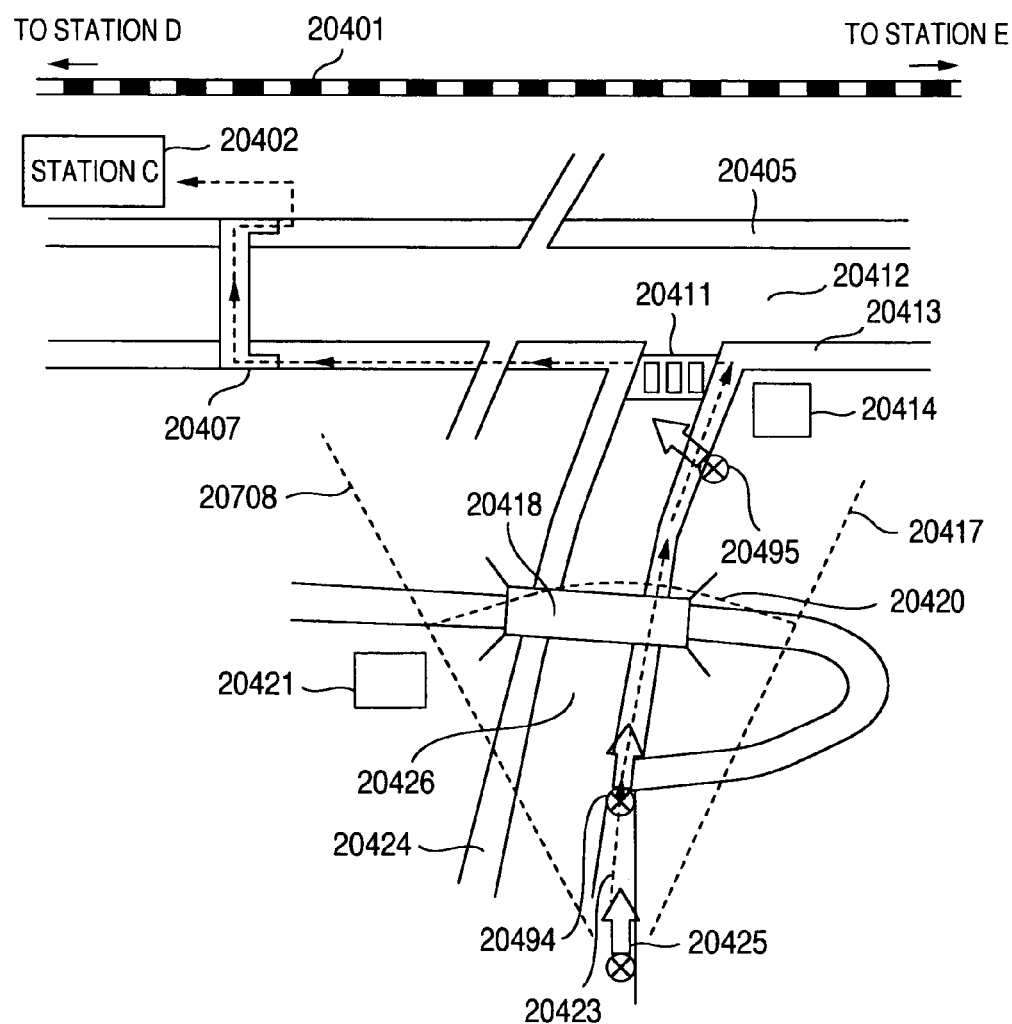
FIG. 13 is a map showing a guidance route for navigation.

FIG. 13 illustrates a map for showing an example of route guidance by the navigation system of the present invention. The geographic information database 17001 stores road data such as roads (vehicular roads) 20412 and 20426, sidewalks 2040-5, 20413, and 20424, facility information such as a footbridge 20407, a crossing 20411, a pedestrian overpass 20418, a railroad 20401, a station 20402, and buildings 20414 and 20421 which will become landmarks, three-dimensional terrain shape information, and traffic sign installment information. The three-dimensional terrain shape information includes altitude information on regions each divided into meshes at equal intervals along latitudes and longitudes or altitude information on road sides. The traffic sign installment information includes installed positions of traffic signs and types or display contents of the traffic signs. A guidance route 20423 indicates the route to be guided for a walker, which has been searched by the route searching unit 27008. Viewpoints 20425, 20494, and 20495 indicate the positions of viewpoints and the directions of the terminal (directions of lines of sight) in FIGS. 14, 15, and 16, respectively. A field of view at the viewpoint 20425 is defined by a viewable range left end 20408, a viewable range right end 20417, and an arc 20420 indicating the remotest position of the field of view.

Figure 14:
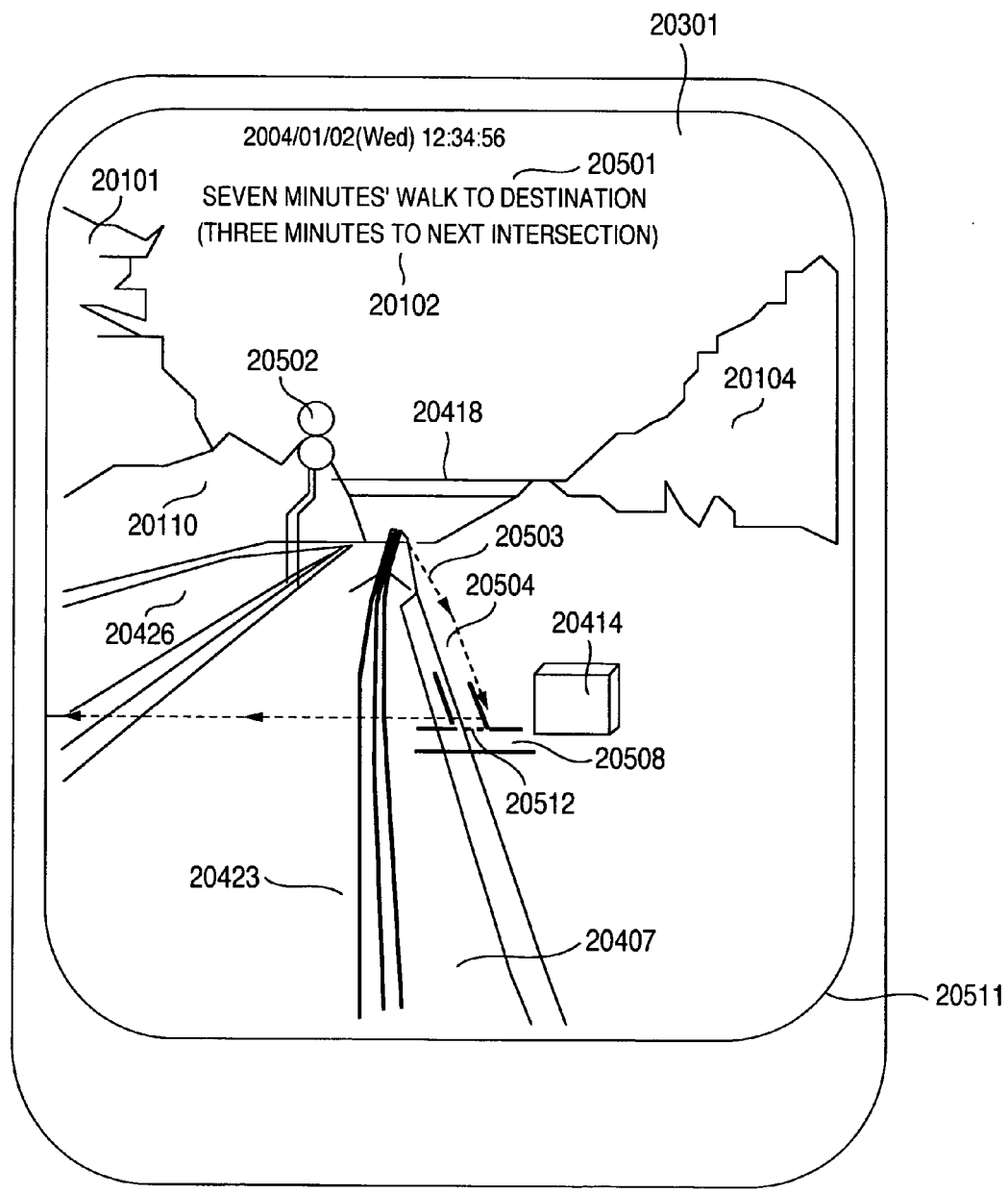
FIG. 14 shows an example of display of the guidance route for navigation.

FIG. 14 shows the display screen of a route for route guidance in this embodiment. It is assumed that at a location indicated by the viewpoint 20425 in FIG. 13 from which route guidance is started, a walker currently stands on a sidewalk, carrying the cellular phone 20105 in his hand. A landscape image photographed by the camera attached to the cellular phone, input from the camera image input unit 27005 is displayed on a display of the cellular phone. When the walker moves his hand, the landscape image displayed on the display also moves according to the movement. In this embodiment, the period of updating the screen is 100 milliseconds. Assume that the cellular phone 20105 with camera shown in FIG. 10 is used. Then, by using the camera pointing to a direction opposite to the display of the cellular phone, the same image as that of the real world currently seen by the user can be displayed on the display of the cellular phone.

On the display screen of the route shown in FIG. 14, display of the route by the navigation system of the present invention is performed. On a main display 20511 of the cellular phone 20105, facility information on a traffic sign 20502 and a pedestrian overpass 20418 in addition to a sidewalk 20407 and a vehicular road 20426 and the landscape image of a mountain 20104, an embankment 20110, trees 20101 and the like, photographed by the camera of the cellular phone 20105 is displayed. On the upper portion of the image taken by the camera, a date and time display 20301, an expected arrival time to destination 20501, an expected arrival time to routing point 20502 are synthesized, for display. An arrow indicating the guidance route 20423, a display indicating the contour of a building 20414 outside-the field of view, a display indicating an intersection 20508, and a dotted line 20512 indicating the crossing 20411 are drawn, being superimposed on the image taken by the camera by the display image synthesis unit 27006. A portion of the guidance route 20423 outside the field of view and a portion of the guidance route 20423 that passes through a range that will become a hidden surface as seen from the viewpoint 20425 based on the three-dimensional terrain shape information are drawn by dotted lines.

An interval between the leading ends of arrows indicating the guidance route 20423 represents a certain walking distance. In this embodiment, an interval between the leading ends of the arrows is one minute's walk. A portion of the guidance route 20423 within the field of view is indicated by three solid lines. Intervals among the three solid lines are displayed to become narrower as the guidance route 20423 is more separated from the position of the walker, thereby representing the depth of the CG image. This is carried out by display transformation processing (perspective transformation processing) by the display image creation unit 10203. The display indicating the intersection 20508 represents the contour of a guidance intersection in a T-junction for the guidance route 20423 outside the field of view, by lines. The dotted line 20512 shows presence of the crossing 20411 provided at the guidance intersection outside the field of view and indicates turning to the left at the T-junction according to the guidance route 20423. Which crossing becomes the guidance intersection on the guidance route 20423 is determined when the guidance route is searched by the route searching unit 27008. When the cellular phone is oriented to the left of the field of view displayed in FIG. 14, as seen from the walker, the image photographed by the camera and displayed on the display of the cellular phone changes together with a change in the orientation of the cellular phone, and together with the change of the image photographed by the camera, the CG image of the guidance route to be superimposed on the image photographed by the camera is also changed.

Figure 15:
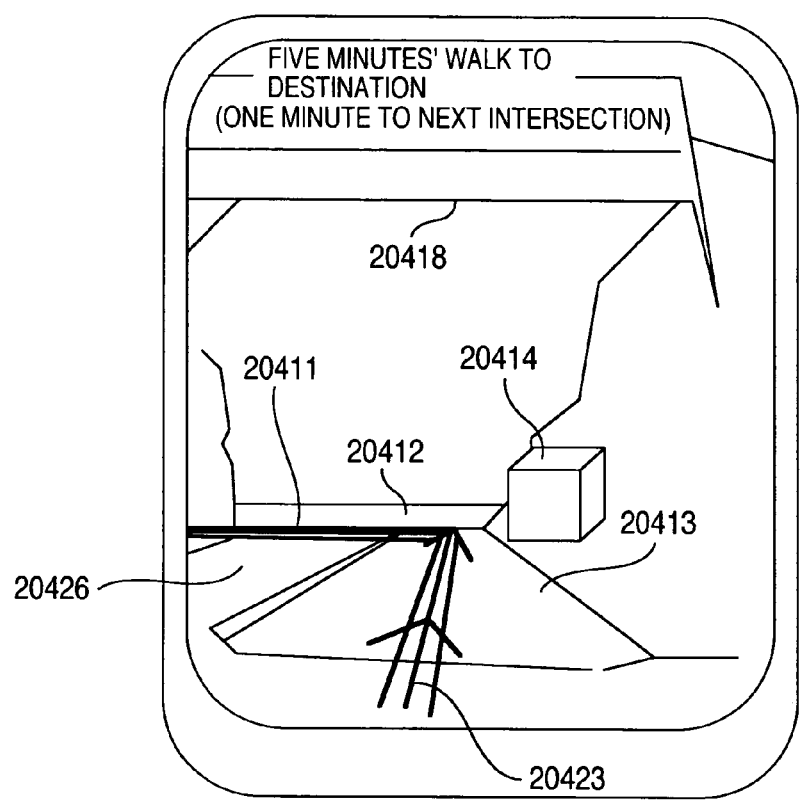
FIG. 15 shows an example of display when a walker proceeds on the guidance route.
Figure 16:
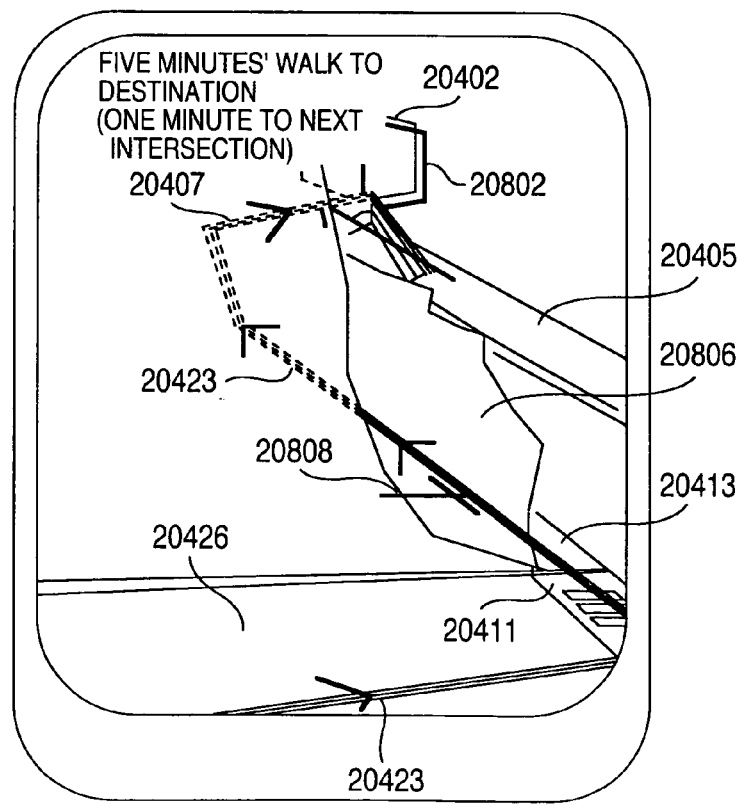
FIG. 16 shows an example of display when the walker proceeds more on the guidance route and orients a portable terminal to the left.

Display by the navigation system when the walker proceeds on the guidance route to a further remote location according to the route guidance on the screen in FIG. 14 will be shown in each of FIGS. 15 and 16. FIG. 15 shows the screen on which the CG image of the guidance route which can be seen within the field of view at the position of the viewpoint 20494 in FIG. 13. FIG. 16 shows the screen displaying the CG image of the guidance route that can be seen within the field of view of the walker who is at the position of the viewpoint 20495 and has oriented the cellular phone in a more left direction than in FIG. 15, as seen from the walker. Referring to FIG. 15, the guidance route 20423 that has been hidden by a surrounding terrain in the field of view at the viewpoint 20425 and drawn in wavy lines is drawn in solid lines. Display of the crossing 20411 and the building 20414 outside the field of view at the viewpoint 20425 in dotted lines disappears, and only the camera image photographed by the camera is displayed.

In FIG. 16, part of the footbridge 20407 hidden by a surrounding terrain at the viewpoint 20495 is complemented by a dotted line 20423 of the CG image. Likewise, a portion of the guidance route 20423 hidden by a surrounding terrain is also drawn by a dotted line. However, since a portion of the guidance route hidden by vegetation 20806 such as trees and woods that is present on the hidden surface cannot be determined from the three-dimensional terrain shape information, the hidden portion is drawn by a solid line. In regard to an intersection with a lane, which is not the guidance intersection, only a brief line drawing 20808 indicating the presence of the intersection is drawn. On the station 20402, which is the destination of the guidance route, a mark 20802 is superimposed for drawing so as to emphasize the presence thereof.

Figure 17:
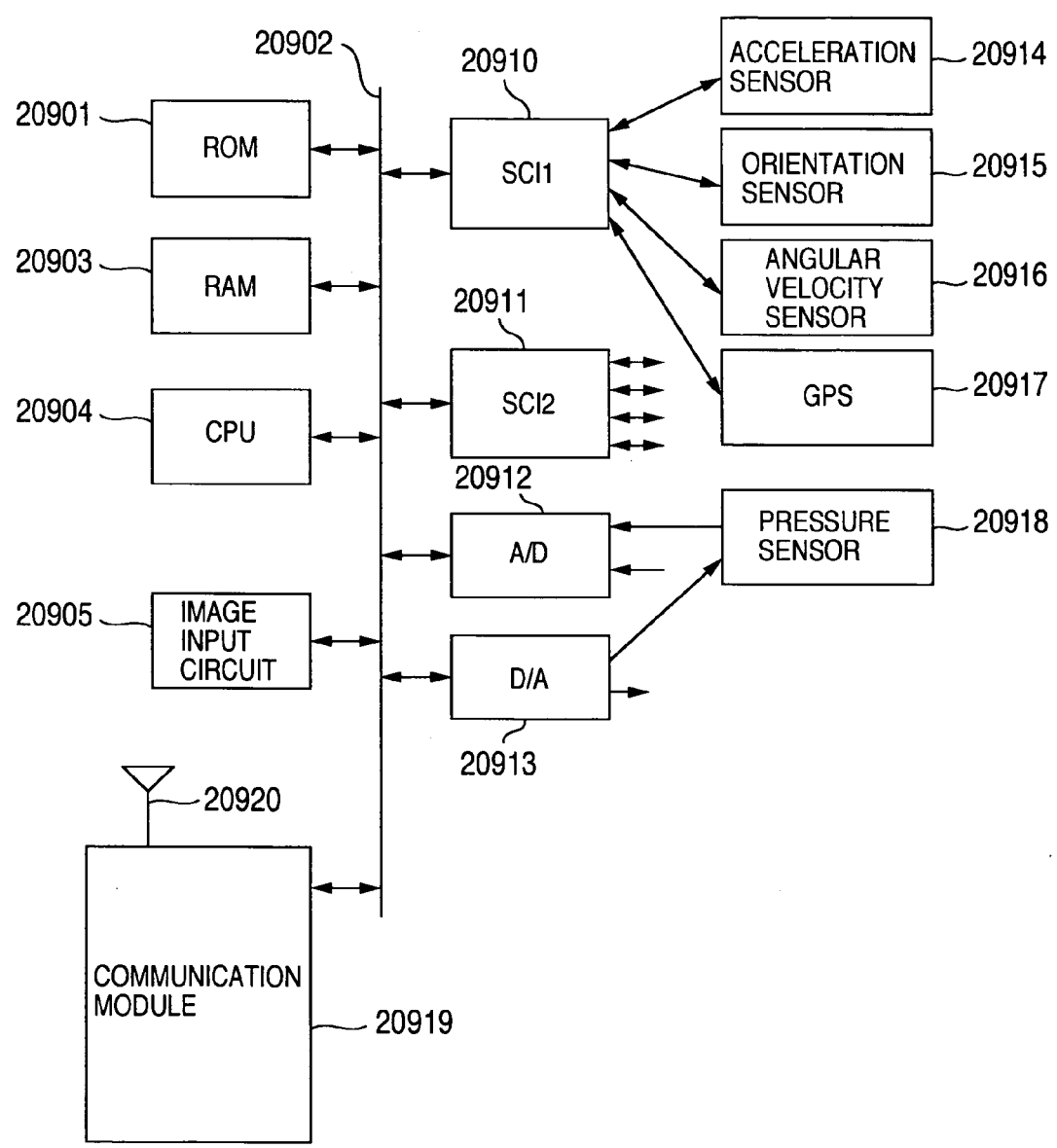
FIG. 17 is a diagram showing an example of a hardware configuration of the navigation system in a portable terminal of the present invention.

FIG. 17 is a diagram showing a hardware configuration of the navigation system (in the cellular phone) of the present invention. The cellular phone 20105 includes an analog-to-digital (A/D) conversion circuit 20912, a digital-to-analog (D/A) conversion circuit 20913, a serial interface (SCI1) 20910, a serial interface (SCI2) 20911, a communication module 20919, and an antenna 20920. A read-only memory (ROM) 20901, a random access memory (RAM) 20903, a central processing unit (CPU) 20904, an image input circuit 20905, and a pressure sensor 20918 are connected to one another by a system bus 20902, and are connected to the analog-to-digital (A/D) conversion circuit 20912. Sensors such as an acceleration sensor 20914, an orientation sensor 20915, an angular velocity sensor 20916, and a global positioning system (GPS) signal receiver 20917 are connected to the serial interface (SCI1) 20910. The serial interface (SCI2) 20911 is provided for performing communication with an external device. The antenna 20920 is connected to the communication module 20919.

The CPU 20904 controls operations of the overall navigation system. The ROM 20901 stores a basic program necessary for the operations of the navigation system. An additional necessary program is downloaded to the RAM 20903 through the communication module 20919, as necessary. The RAM 20903 also stores temporary data required at the time of program execution. Information from the acceleration sensor 20914, orientation sensor 20915, angular velocity sensor 20916, and the GPS signal receiver 20917 is transmitted to the CPU 20904 through the serial interface 20910 and processed at the CPU 20904. The offset value of the pressure sensor and the amplification rate of the pressure sensor are determined by an analog signal output from the D/A conversion circuit 20913 to the pressure sensor 20918. This allows high-accuracy sampling over a wide range using a small number of quantization levels.

The acceleration sensor 20914 detects the acceleration of gravity when the portable terminal is in the static state, so that information on the inclination of the portable terminal can be obtained. This acceleration sensor is constituted from the sensors of three axes. The acceleration sensor 20914 measures the vertical motion frequency of the cellular phone, so that the walking speed of the walker carrying the cellular phone can be roughly estimated. By combining information obtained from the orientation sensor 20915 with information obtained from the acceleration sensor 20914, information on the orientation of the camera of the terminal can be obtained. Fluctuations of the orientation of the camera can be compensated for by combining information from the angular velocity sensor with the information from the orientation sensor. Information on absolute latitude and longitude can be obtained by the GPS signal receiver 20917.

In this embodiment, the foregoing description was mainly given to superimposition of the CG image of a guidance route on an actually photographed image. The CG image of a landscape, however, can be used in place of the actually photographed image. In this case, a route guidance function is added to the navigation system in the first embodiment. Route guidance using all CG images thereby also becomes possible.

Figure 18:
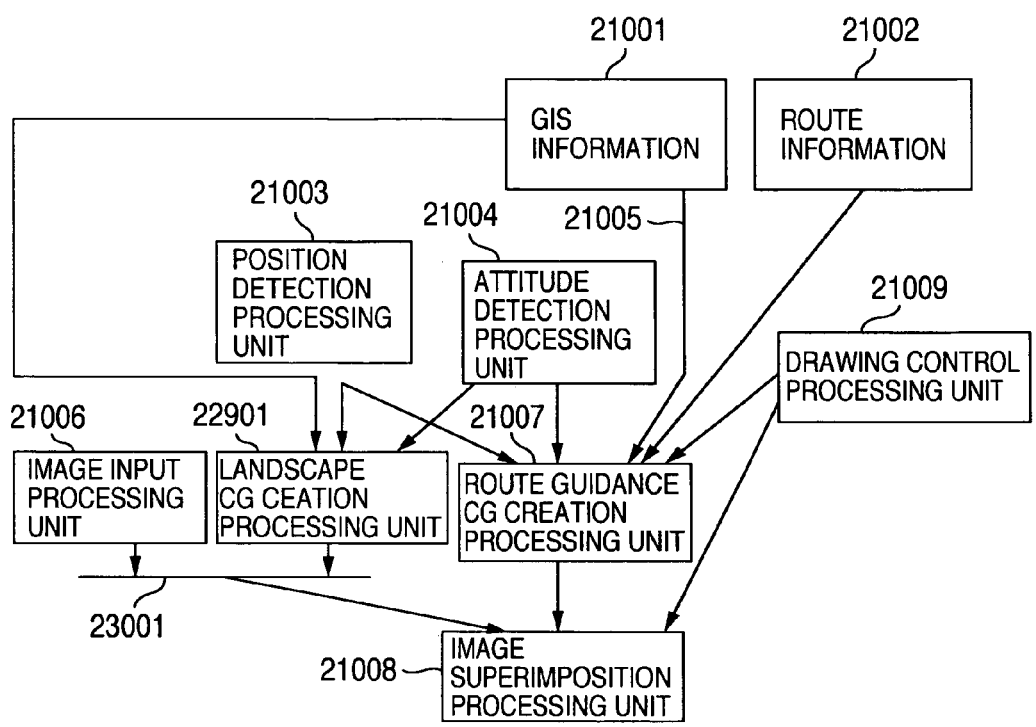
FIG. 18 is a block diagram when the CG image of a landscape is used in the navigation system of the present invention.

FIG. 18 shows an example of a configuration of the navigation system when the CG image of a route is superimposed on the CG image of a landscape. A landscape CG creation processing unit 22901 receives information from a GIS information unit 21001, a position detection processing unit 21003, and an attitude detection processing unit 21004, and creates the three-dimensional CG image of the landscape actually seen from the camera. The viewpoint position and line-of-sight direction of the three-dimensional CG image can be obtained in the same manner as described above.

The navigation system in FIG. 18 is so configured that selection of a landscape image is made between an actually photographed image and a three-dimensional CG image by a selector 23001, and that selection between the actually photographed image from an image input processing unit 21006 and the CG image of the landscape from the landscape CG creation processing unit 22901 is made, thereby passing image data to an image superimposition processing unit 21008. By facilitating switching between the actually photographed image and the CG image as a landscape image, the actually photographed image and the CG image can be used in a proper manner as follows: when a load on a computer in the cellular phone or the network to which the cellular phone is connected is to be reduced, the actually photographed image is employed. On the other hand, during the night, rain, or fog, when the actually photographed image is not clearly seen, the CG image is used.

By applying the present invention to the portable terminal and by performing guidance display that combines an actually photographed image with a CG image and that is intuitively obvious, an easy-to-use route guidance system can be implemented.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A navigation apparatus for displaying a three-dimensional terrain image based on a position and attitude of the navigation apparatus, comprises:

a display unit having a display screen for displaying the three-dimensional terrain image;

a position detection device which detects a current position of the navigation apparatus;

an attitude detection device which detects a current attitude of the navigation apparatus;

a geographic information storage device for storing three-dimensional terrain shape information; and an image creation unit for obtaining information that characterize a line-of-sight vector perpendicular to the display screen of the display unit, based on attitude information obtained by the attitude detection device, and creating the three-dimensional terrain image from a view point that is located along the line-of-sight vector, based on the current position detected by the position detection device, a line-of-sight defined by the line-of-sight vector, and three-dimensional terrain shape information stored in the geographic information storage device; wherein, when the attitude of the navigation apparatus is changed, the three-dimensional terrain image is updated according to the change of the attitude; and when an angle formed between the line-of-sight vector and a gravity vector is equal to or less than a predetermined value, height of the viewpoint of the three-dimensional terrain image for display on the screen is made higher than the height of the current position of the navigation apparatus as detected by position detection device.

2. The navigation apparatus according to claim 1, wherein, when the angle formed between the line-of-sight vector and the gravity vector is equal to or less than the predetermined value, the display unit displays a two-dimensional map in place of the three dimensional terrain image.

\* \* \* \* \*